June 9, 1931. E. PAGAARD 1,808,861
WHEEL CLEANER FOR TRACTORS
Filed Feb. 27, 1929
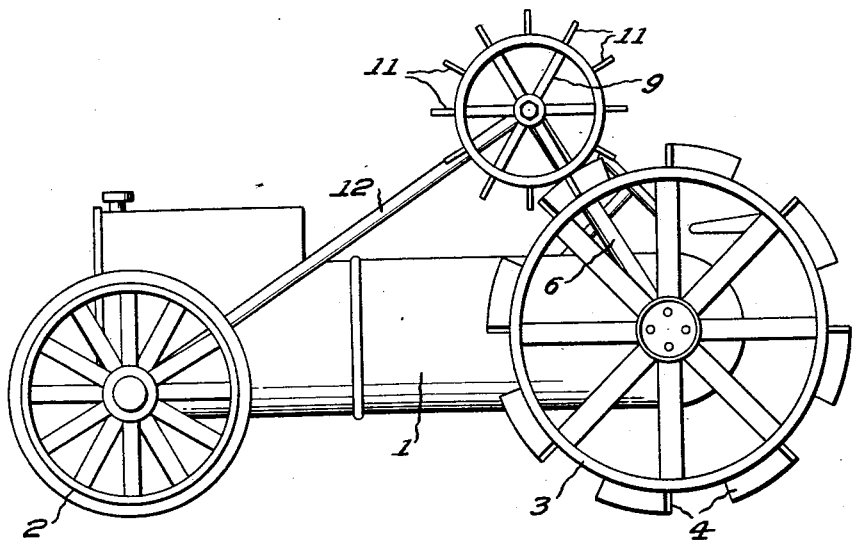
FIG. 1
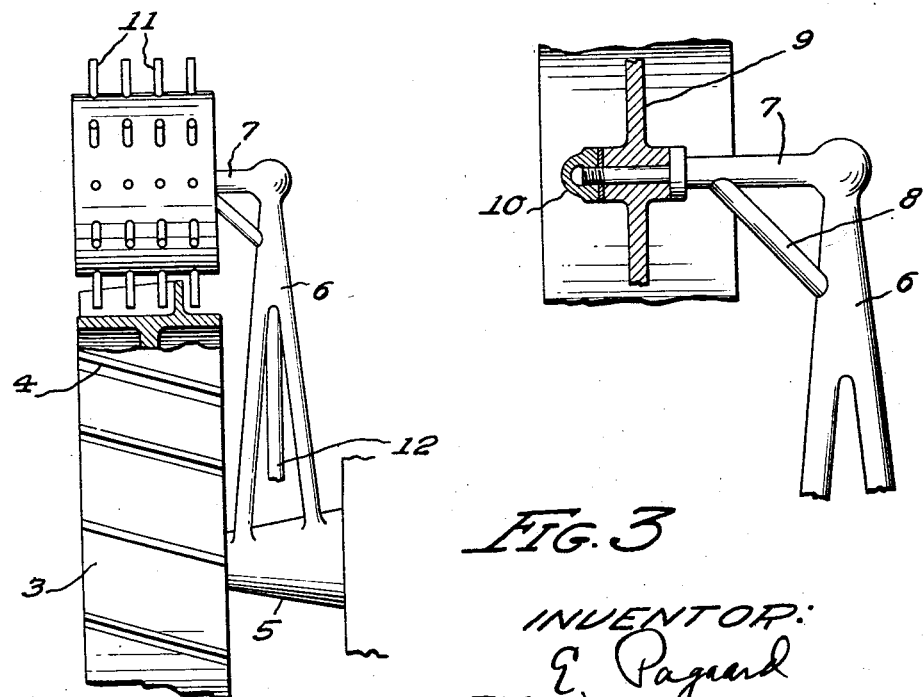
FIG. 2
FIG. 3
INVENTOR:
E. Pagaard
BY H.J. Sanders
ATTORNEY Patented June 9, 1931

1,808,861

UNITED STATES PATENT OFFICE

ERNEST PAGAARD, OF ROSS, IOWA

WHEEL CLEANER FOR TRACTORS

Application filed February 27, 1929. Serial No. 343,186.

This invention relates to improvements in wheel cleaners for tractors and its chief object is to provide a device of this type that is positive and efficient in operation, inexpensive to manufacture and durable in use. A further object is to provide a wheel cleaner driven by rotation of the vehicle wheel.

With the foregoing and other objects in view the invention consists in the combination and arrangement of parts to be hereinafter fully described, pointed out in the claim and illustrated in the accompanying drawings which form a part of this application for patent and in which—

Fig. 1 is a side view of a tractor equipped with the improved wheel cleaner.

Fig. 2 is a fragmentary end view of Fig. 1, partly in section, slightly enlarged.

Fig. 3 is a fragmentary sectional view of Fig. 2.

Like reference characters denote corresponding parts throughout.

Increased efficiency in operation will be gained by keeping the wheels of the tractor clean while it is in operation as the accumulation of clods of earth, weeds, etc., upon the wheel periphery prevent its proper engagement with the ground.

The reference numeral 1 denotes a tractor having the usual front wheels 2 and the rear traction wheels 3 provided with the peripheral lugs 4.

Mounted upon the rear axle housing 5 upon each side of the tractor is a standard 6 formed with an integral laterally disposed arm 7 braced by the bar 8 to said standard, said arm 7 at its free end carrying the cleaner wheel 9 removably retained in position by the cap 10, said wheel 9 being of a width substantially the same as the traction wheel and formed with rows of teeth 11, said teeth 11 being so arranged and spaced apart and the wheel 9 so supported relative to the traction wheel that the teeth 11 pass between the several lugs 4 of the wheel 3 contiguous to the periphery thereof for engagement with and removal therefrom of such earth clods and adhering matter generally as may become lodged thereupon.

Rotation of the wheel 3 as the tractor moves will cause rotation of the cleaner wheel by engagement therewith of the lugs 4 or the matter gathered by the wheel 3. A support rod 12 extending from the front axle housing upon each side of the machine engages with and further braces the standard 6.

What is claimed is:—

In a wheel cleaner for tractors provided with wheels having obliquely disposed peripheral lugs, a standard supported upon the vehicle axle housing and comprising an integral laterally extending arm, a cleaner wheel freely supported upon said arm, and teeth for said wheel extending outwardly from the periphery thereof into immediate proximity to the periphery of the tractor wheel and its peripheral lugs for contact with and removal of such extraneous matter as may be lodged thereupon, said teeth being arranged in parallel rows extending transversely of the wheel circumference, such contact serving as the sole means for rotating said cleaner wheel upon its support.

In testimony that I claim the foregoing as my own I have hereto affixed my signature.

ERNEST PAGAARD.